3,287,272
LUBRICATING OIL COMPOSITION
William Katzenstein, Bethlehem, Pa., assignor to General Aniline & Film Corporation, New York, N.Y., a corporation of Delaware
No Drawing. Filed May 18, 1964, Ser. No. 368,415
20 Claims. (Cl. 252—51.5)

This invention relates to improved hydrocarbon lubricants, and particularly to hydrocarbon lubricating oil compositions of improved viscosity index and possessing excellent sludge and corrosion inhibiting properties.

Many lubricating oil compositions commercially available for combustion engines are based on the use of a base lubricating oil modified by specific additives that impart desired characteristics such as, high viscosity index, detergency, sludge inhibiting, anti-wear, and anti-rust properties. In developing lubricant additives to impart these characteristics, two or more additives must be added to the base lubricating oil without adversely affecting other desirable performance characteristics of the finished lubricant. Recently, multi-functional additives or additive systems that improve two or more properties of the base oil lubricant have been the object of extensive research.

It is the object of the present invention to provide an improved lurbicating oil composition containing a single multi-functional additive which not only acts as viscosity index improver, corrosion inhibitor, but also as ashless dispersant for gums, resins and other oxidation products which may be present or be formed in said oil during the operation of combustion engines of various types.

Other objects and advantages will become manifest from the following description:

I have discovered that products obtained by the simultaneous polymerization and alkylation of heterocyclic N-vinyl monomers are excellent multi-functional additives for lubricating oils which act as viscosity index improvers, corrosion inhibitors and as ashless (metal-free) dispersants. In the latter category they reduce sludge, i.e. gums and resins, in stop and go driving, eliminate the formation of ash or carbon deposits which cause preignition, reduct octane requirements of gasoline and reduce valve failure caused by deposit formation. These additives are obtained by the simultaneous polymerization and alkylation of one mole of a heterocyclic N-vinyl monomer alone or a mixture of 2 different heterocyclic N-vinyl monomers with 0.5 to 12 moles of an α-olefin of at least 8 carbon atoms in solution of an organic solvent common to the monomer, mixture of monomers and the α-olefin in the presence of 0.025 to 0.30 mole of an organic peroxide catalyst per mole of said α-olefin at a temperature of from 80° to 200° C. for a period of time ranging from 3 to 60 hours. The degree of alkylation is determined by the amount of α-olefin consumed and ranges from as low as 25% to 90% by weight of the alkylated polymer. The average molecular weight of such alkylated polymer varies from 50,000 to as high as 250,000. After the simultaneous polymerization and alkylation reaction has been completed the reaction mixture is subjected to vacuum distillation and the removed organic solvent replaced by a saturated aliphatic hydrocarbon having a boiling point higher than the initial organic solvent. After the initial organic solvent has been removed there is obtained a solution of the alkylated polymer in solution of the aliphatic hydrocarbon of from 6 to 60 carbon atoms including isomers thereof, mineral and lubricating oils having a Saybolt viscosity of from 50 to 200 seconds.

The procedure for simultaneously polymerizing and alkylating heterocyclic N-vinyl monomers is more fully described in copending application of Ashot Merijan and Frederick Grosser, Serial No. 358,406, filed on April 8, 1964, the complete disclosure and teachings of which are incorporated herein by reference thereto.

The heterocyclic N-vinyl monomers which are simultaneously polymerized and alkylated with an α-olefin of at least 8 carbon atoms, are characterized, inter alia, by the following formulae:

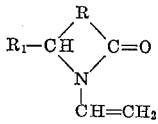

wherein R represents an alkylene bridge group, i.e., —CH$_2$CH$_2$—, —CH$_2$—CH$_2$—CH$_2$— and CH$_2$—CH$_2$—CH$_2$—CH$_2$— to complete a 5, 6 and 7-membered heterocyclic ring system (lactam) and R$_1$ represents either hydrogen N-vinyl-5-methyl-2-pyrrolidone, N-vinyl-2-piperidone, N-vinyl-6-methyl-2-piperidone, N-vinyl caprolactam, and N-vinyl-7-methyl caprolactam. Comparable compounds are available from the corresponding thiolactams and these can be used in the process.

Another group of heterocyclic vinyl-monomers comprises N-vinyl oxazolidone, N-vinyl succinimide, N-vinyl piperidine, N-vinyl diglycolylimide, N-vinyl glutarimide, N-vinyl-3-morpholinone; amides, obtained by the reaction of a 5-, 6- or 7-membered lactam with acryloyl or methacryloyl chloride or bromide in the presence of a hydrogen halide acceptor such as pyridine, dimethylaniline, etc., having the structure

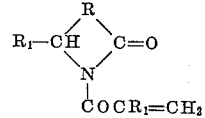

wherein R and R$_1$ have the same values as above. Illustrative compounds are N-methacryloyl-pyrrolidone, -piperidone and -caprolactam; N-methacryloyl-5-methyl-pyrrolidone, N-methacryloyl-6-methylpiperidone and N-methacryloyl-7-methyl caprolactam; N-acryloyl-pyrrolidone, -piperidone and -caprolactam; N-acryloyl-5-methyl-pyrrolidone, N-acryloyl-6-methylpiperidone and N-acryloyl-7-methyl caprolactam; and acrylic esters having the structure

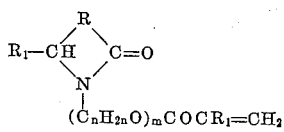

wherein R and R$_1$ have the same values as above, $m$ is an integer of from one to four, and $n$ is an integer of from one to four when $m$ has a value of one and from two to four when $m$ has a value greater than one. Illustrative compounds are N-acryloxymethyl-pyrrolidone, -piperidone and -caprolactam; N-methacryloxy-ethoxyethyl-pyrrolidone, -piperidone and -caprolactam; N-methacryloxypropyl-pyrrolidone, -piperidone and -caprolactam; N- methacryloxymethyl-pyrrolidone, -piperidone and -caprolactam; N-methacryloxyethyl-pyrrolidone, -piperidone and -caprolactam; N-methacryloxymethyl-5-methylpyrrolidone, -6-methylpiperidone, and -7-methyl-caprolactam; including amidoalkyl lactams of the structure:

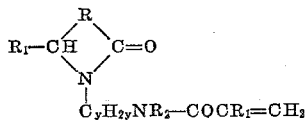

wherein R and $R_1$ have the same value as above, $R_2$ represents hydrogen, alkyl group of from 1 to 12 carbon atoms or phenyl, and $y$ represents an integer of from 2 to 3. Illustrative compounds of this type are N-methacrylamidomethyl-, N-methacrylamidoethyl-, N-methacrylamidopropyl- and N-(N-phenylacrylamidopropyl)-pyrrolidones, -piperidones and -caprolactams, which are readily prepared by reacting acryloyl or methacryloyl chloride or bromide with an N-(aminoalkyl)-lactam, wherein the alkyl is from 1 to 12 carbon atoms, in the presence of any conventional base to take up the hydrogen halide.

Where a mixture of two different heterocyclic N-vinyl monomers are simultaneously polymerized and alkylated, the comonomer mixture may contain from 5 to 95% by weight of any one of the foregoing heterocyclic vinyl monomers and from 1% to 95% by weight of a different heterocyclic N-vinyl monomer. The procedure with such monomers is exactly the same as that employed where one single heterocyclic N-vinyl monomer is simultaneously polymerized and alkylated.

Any α-olefin having a molecular weight from about 112 to as high as 2500 may be employed in the alkylation of monomers of the above heterocyclic N-vinyl monomers alone, or in admixture during the simultaneous polymerization and alkylation reaction. In other words, α-olefins ranging from 1-octene, 1-dodecene, 1-tetradecene, 1-hexadecene, 1-heptadecene, 1-octadecene, 1-nonadecene, 1-eicosene, 1-docosene, 1-tetracosene, 1-pentacosene, trimerized α-tetradecene to polybutenes of molecular weight of 400 to 2500 may be employed.

Instead of employing any one of the foregoing individual α-olefins, a mixture of commercially available linear α-olefins produced by cracking petroleum wax or by polymerizing lower olefins may also be used as the alkylating agent. The commercial product composition contains a mixture of linear olefins. Such mixture may contain linear olefins ranging from 12 to 16 carbon atoms, 16 to 20 carbon atoms, and as high as 20 to 42 carbon atoms. By careful distillation of the commercial product composition substantially individual olefins are obtained which may be used as the alkylating agent.

In carrying out the simultaneous polymerization and alkylation reaction, an organic solvent common to the α-olefin, the heterocyclic N-vinyl monomer alone, or a mixture of 2 different heterocyclic N-vinyl monomers should be employed. As solvents, various alcohols such as methanol, ethanol, propanol, isopropanol, butanol, sec-butanol, amyl alcohol, hexanol, 2-ethyl-1-hexanol, ethylene glycol, 1,2-butanediol, 1,4-butanediol, etc. are very effective. Other solvent such as diacetone alcohol, diethylene glycol, ethylene glycol monomethyl ether acetate, methylene chloride and the like may also be employed. It is to be noted that the nature or character of the organic solvent is immaterial so long as it is a liquid, forms a solution with the heterocyclic N-vinyl monomers, the α-olefin and is not susceptible to alkylation.

The amount of organic solvent employed is not critical. Any amount which will yield a solution of the monomer, mixture of monomers, and α-olefin will suffice. However, for purposes of expediency, for every part by weight of monomer, or a mixture of monomers, from 2 to 10 parts of organic solvent, either by volume or by weight, are sufficient to yield a workable solution.

As a peroxide catalyst (initiator) for the polymerization and alkylation reaction any one of the known organic peroxides normally employed as initiators in chemical reactions, such as, for example, t-butyl-perbenzoate, dibenzoyl peroxide, benzoyl hydroperoxide, t-butyl hydroperoxide, t-butyl perphthalic acid, p-chlorobenzoyl peroxide, t-butyl peracetate, di-t-butyl peroxide, cumene peroxide, etc., may be employed.

Where it is desired that the alkylated polymer be in solution in an aliphatic liquid hydrocarbon of from 6 to 60 carbon atoms including mineral oils or lubricating oils of a paraffinic stock, the simultaneous polymerization and alkylation reaction is preferably conducted in the presence of a higher boiling aliphatic alcohol such as, for example, hexanol. After the alcohol has been removed the solution of the alkylated polymer in the aliphatic hydrocarbon may be employed as the multi-functional additive. Saturated aliphatic hydrocarbons having a boiling point higher than hexanol are legion and commercially available. Hence, no difficulty should be encountered in the selection of such hydrocarbon in preparing a solution of the alkylated polymer or copolymer.

For the purpose of the present invention, it has been found that a refined lubricating oil of naphthenic stock having a Saybolt viscosity of 100 seconds is ideally suited as a replacement during the removal of the higher boiling alcohol during vacuum distillation following the completion of the simultaneous polymerization and alkylation reaction. For sake of simplicity, such lubricating oil will be referred to hereinafter as "refined naphthenic stock."

The following examples will show how the various heterocyclic N-vinyl monomers alone or a mixture of two different heterocyclic N-vinyl monomers are simultaneously polymerized and alkylated and the results obtained when employed as additives for lubricating oils employed in combustion engines of various types.

*Example I*

Into a one-liter, four-necked flask equipped with stirrer, thermometer, nitrogen inlet and reflux condenser, the following ingredients were charged and the system then purged with nitrogen:

N-vinyl-2-pyrrolidone=111 grams (1.0 mole)
α-eicosene=280 grams (1.0 mole)
methyl isobutyl carbinol=200 grams
di-t-butyl peroxide=14.6 grams (0.1 mole)

The contents were maintained at 130–135° C. for 16 hours and then a second addition of 7.3 grams (0.05 mole) peroxide was made and reaction continued for 8 more hours. (Total peroxide=21.9 grams, 0.15 mole.) The solution was cooled and analyzed. The analytical data showed the total absence of N-vinyl-2-pyrrolidone and only 5.48% α-eicosene, corresponding to 33.6 grams of unreacted olefin. The contents were subjected to vacuum distillation and as the solvent was removed 391 grams, 100 Sec. Solv. was added. At completion, a clear viscous fluid weighing 780 grams (50% solution) was obtained. On cooling to room temperature the product concentrate turned to a waxy solid, but became a clear fluid on warming.

*Example II*

Into a one-liter, four-necked flask equipped with stirrer, thermometer, nitrogen inlet and reflux condenser, the following materials were charged:

N-vinyl-2-piperidone=125 grams (1.0 mole)
α-octadecene=252 grams (1.0 mole)
normal butanol=200 grams
di-t-butyl peroxide=14.6 grams (0.1 mole)

The flask was purged thoroughly with nitrogen and heated. The contents were maintained at reflux (120° C. pot) for 30 hours and then cooled and analyzed. The analyses showed the total absence of N-vinyl-2-piperidone and the presence of only 3.05% of α-octadecene in the solution, corresponding to 18 grams unreacted olefin.

When all the solvent was stripped in vacuum and substituted with 377 grams of refined naphthene stock, a very clear oily solution, weighing 750 grams (50% solution), was obtained.

*Example III*

Into a one-liter, four-necked reaction flask, equipped with stirrer, thermometer, nitrogen inlet and reflux condenser, the following materials were charged:

N-vinyl-ε-caprolactam=139 grams (1.0 mole)
α-octadecene=214 grams (0.85 mole)
methyl isobutylcarbinol=200 grams
di-t-butyl peroxide=13.1 grams (0.09 mole)

The flask was then purged thoroughly with nitrogen, heated and maintained at 125–135° C. for 24 hours. The contents when analyzed showed the absence of N-vinyl-ε-caprolactam and the presence of 4.54% of the α-octadecene, corresponding to only 25.7 grams of the unreacted olefin. Then as the solvent was stripped in vacuum, 353 grams of refined napthene stock was added and the product obtained as a 50% oil solution (705 grams).

*Example IV*

Into a one-liter, four-necked flask equipped with stirrer, thermometer, nitrogen inlet and reflux condenser, the following ingredients were charged:

N-vinyl-2-pyrrolidone=55.5 grams (0.5 mole)
N-vinyl-3-morpholinone=63.5 grams (0.5 mole)
methyl isobutylcarbinol=200 grams
α-octadecene=315 grams (1.25 mole)
t-butyl hydroperoxide=11 grams (0.12 mole)

The flask was purged with nitrogen thoroughly and heated. The contents were maintained at 130–140° C. for 12 hours and then 11.0 more grams of peroxide were added and heating continued for another 12 hours. (Total peroxide=22 grams or 0.24 mole.) In analysis of the contents, no trace of N-vinyl-2-pyrrolidone or N-vinyl-3-morpholinone were found but only the presence of 11.6% of α-octadecene were detected which indicates a residual of 76 grams of unreacted olefin. The contents were then transferred into a two-liter flask and the solvent stripped in vacuum and substituted with 434 grams of refined naphenic stock. The final 50% solution was a clear amber liquid weighing 860 grams.

*Example V*

Into a one-liter, four-necked flask equipped with stirrer, thermometer, nitrogen inlet and reflux condenser, after a thorough nitrogen purge, the following ingredients were charged and heated:

N-vinyl-5-methyl-2-pyrrolidone=125 grams (1.0 mole)
Hexanol (mixture of isomeric hexanoles)=200 grams
α-octadecene=227 grams (0.9 mole)
di-t-butyl peroxide=15 grams (0.1 mole)

The solution was maintained at 120–140° C. for 30 hours and then cooled and analyzed. It was found to contain less than 0.1% by weight of monomer and only 2.4% α-octadecene, corresponding to 13.6 grams, or a 94% consumption of the α-olefin charged. When the solvent was removed in vacuum and substituted with 352 grams of refined naphenic stock, a clear (50%) solution was obtained which weighed 700 grams (Theory=704 grams).

*Example VI*

Into a one-liter, four-necked flask equipped with stirrer, thermometer, nitrogen inlet and reflux condenser, after a thorough nitrogen purge, the following ingredients were charged:

N-vinyl-2-oxazolidone=56.5 grams (0.5 mole)
methyl isobutylcarbinol=200 grams
α-eicosene=200 grams (0.75 mole)
di-t-butyl peroxide=11.0 grams (0.075 mole)

The mixture was then heated and maintained at 120–140° C. for 12 hours and then another 11.0 grams (total peroxide=22.0 grams, 0.15 mole) peroxide added and the reaction continued. After a total of 28 hours reaction period, the contents were cooled and analyzed. It was found to contain 0.2% by weight of N-vinyl oxazolidone (equivalent to 0.98 gram) and 3.44% of α-eicosene (equivalent to 16.8 grams) by weight of the solution. To form a 35% solution of the product in the refined napthenic stock, the solvent was stripped in vacuum and at the same time 495 grams of the refined napthenic stock was added. The final solution obtained was clear and weighed 760 grams. (Theory=761.5 grams).

*Example VII*

Into a one-liter, four-necked flask equipped with stirrer, thermometer, nitrogen inlet and reflux condenser, the following ingredients were charged:

N-vinyl-3-morpholinone=63.5 grams (0.5 mole)
normal butanol=150 grams
α-hexadecene=224 grams (1.0 mole)
di-t-butyl peroxide=15 grams (0.1 mole)

The flask was purged with nitrogen, heated and maintained at reflux (118°–124° C.) for 16 hours. Then another 7.0 grams peroxide was added (total peroxide=22.0 grams, 0.15 mole) and refluxing continued for 20 more hours (total=36 hours). The contents were then cooled and analyzed. It was found to contain 0.05% of N-vinyl-3-morpholinone (equivalent to 0.23 gram) and 4.7% α-hexadecene (equivalent to 21.6 grams unreacted) by weight of solution. Then the solvent of the product-solution was stripped and the remainder subjected to high vacuum (0.05–1.0 mm. Hg) and temperatures of up to 140° C. The residue obtained weighed 280 grams, and was clear, colorless and very viscous. This product was soluble in a variety of polar and non-polar organic solvents.

*Example VIII*

Into a one-liter, four-necked flask equipped with stirrer, thermometer, nitrogen inlet and reflux condenser, the following ingredients were charged:

N-vinyl succinimide=62.5 grams (0.5 mole)
Methyl isobutylcarbinol=150 grams
α-eicosene=182 grams (0.65 mole)
di-t-butyl peroxide=15 grams (0.1 mole)

The flask was purged with nitrogen, heated and maintained at a range of 120–140° C. for 30 hours. The contents were then cooled and analyzed and found to contain only a trace of N-vinyl succinimide and 3.66% (equivalent to 15.0 grams unreacted only) of α-eicosene by weight of the solution. Then 244.5 grams of refined naphthenic stock was added and the solvent stripped in vacuum. The final 50% solution obtained was clear and weighed 485 grams. (Theory=489.0 grams.)

*Example IX*

Into a one-liter, four-necked flask equipped with stirrer, thermometer, nitrogen inlet and reflux condenser, after a thorough nitrogen purge, the following ingredients were charged and heated:

N-methacryloyloxyethylpyrrolidone=46.0 grams (0.23 mole)

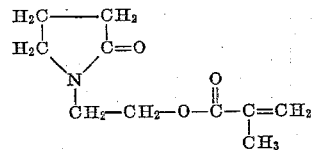

N-butanol=200 grams
α-eicosene=140 grams (0.5 mole)
di-t-butyl peroxide=10 grams The mixture (clear phase) was maintained at reflux (117–125° C.) for 20 hours and then another 5.0 grams peroxide added (total peroxide=15.0 grams, 0.1 mole) and refluxing continued for 16 more hours. The contents were then cooled and analyzed. The analysis showed the total absence of the methacrylate and only 3.0% (equivalent to 12.0 grams unreacted) of α-eicosene. The solvent was then stripped in vacuum and substituted with 186 grams of refined naphthenic stock. The final 50% solution in the 100 Sec. Solvent was clear and weighed 371 grams. (Theory=372 grams.)

*Example X*

Example VI was repeated with the exception that sufficient refined naphthenic stock was added during the vacuum stripping of the methyl isobutylcarbinol to yield a 50% solution.

*Example XI*

250 grams of the alkylated polymer of Example VII were dissolved in 500 grams of refined naphthenic stock by heating with agitation to 160° F. to yield a 50% solution.

*Example XII*

Example I was repeated with the exception that 280 grams of α-eicosene were replaced by 168 grams (1.0 mole) of α-dodecene commercially obtainable under the brand name of Alfene 12 and sufficient refined naphthenic stock was added during the vacuum stripping of the methyl isobutylcarbinol to yield a 50% solution.

*Example XIII*

Example I was again repeated with the exception that 280 grams of α-eicosne were replaced by 378.7 grams (1.0 mole) of α-heptacosene and sufficient refined naphthenic stock was added during the vacuum stripping of the methyl isobutylcarbinol to yield a 50% solution.

*Example XIV*

Into a one-liter, four-necked flask equipped with stirrer, thermometer, nitrogen inlet and reflux condenser, the following materials were charged:

N-vinyl-2-pyrrolidone=112.21 grams (1.0 mole)
α-octene=112.21 grams (1.0 mole) )
normal butanol=200 grams
di-t-butyl peroxide=14.6 grams (0.1 mole)

The flask was purged thoroughly with nitrogen and heated. The contents were maintained at reflux for 30 hours and then cooled and analyzed. The analysis showed the total absence of N-vinyl-2-pyrrolidone and the presence of only 3% of α-octene in the solution corresponding to 13.13 grams of unreacted olefin.

When all the solvent was stripped in vacuum and substituted with 450 grams of 100 Sec. Solv., a very clear oily solution, weighing 674 grams (50%) was obtained.

*Example XV*

Into a one-liter, four-necked flask equipped with stirrer, thermometer, nitrogen inlet and reflux condenser, the following materials were charged:

N-vinyl-2-pyrrolidone=55.5 grams (0.5 mole)

$C_{42}$ α-olefin obtained by the trimerization of α-tetradecene=294 grams (0.5 mole)
methyl isobutylcarbinol=120 grams
di-t-butyl peroxide=15 grams (0.1 mole)

The flask was purged thoroughly with nitrogen and heated. The contents were maintained at reflux for 24 hours and then cooled and analyzed. The analysis showed the total absence of N-vinyl-2-pyrrolidone and the presence of 7.75% of the $C_{42}$ α-olefin in the solution corresponding to 37.5 grams of unreacted olefin.

When all the solvent was stripped in vacuum and substituted with 349 grams of 100 Sec. Solv., a clear amber colored oily solution, weighing 695 grams (50%), was obtained. The solution solidifies on cooling to an amber colored wax, but reverts to the liquid phase on warming.

Instead of employing the products of the simultaneous polymerization and alkylation of individual heterocyclic N-vinyl monomers and mixtures thereof, I have found that homopolymers and copolymers obtained by the polymerization of all of the foregoing heterocyclic N-vinyl monomers alone or a mixture of two such monomers in the proportions indicated heretofore followed by alkylation with α-olefin of at least 8 carbon atoms are equally effective as multi-functional additives in lubricating oils. the K value, viscosity coefficient K, described in Modern Plastics, 23, No. 3, 157–61, 212, 214, 216, 218, 1945), of such homopolymers and copolymers may range from 10 to 140, preferably of 30 to 100 because of their viscosity at lower concentrations, prior to alkylation. The alkylation procedure is precisely the same as that described above. In other words, instead of starting out with one mole of a heterocyclic N-vinyl monomer or one mole of a mixture of two such monomers, one mole of the corresponding homopolymer or copolymer is used. The following examples will illustrate this alternate procedure.

*Example XVI*

Polyvinylpyrrolidone having a K value of 90 (55 grams, 0.5 equivalents) was dissolved in 300 mls. of hexanol and then 98.0 grams (0.35 mole) of α-eicosene and 7.5 grams (0.051 mole) of di-t-butyl peroxide added and the mixture heated for 49 hours at 125–130° C. with agitation. After cooling, 154.0 grams of refined naphthenic stock was added and the contents subjected to vacuum distillation. A total of 295 mls. of solvent corresponding to 98.3% of the original hexanol was recovered. The clear liquid residue weighing 306.4 grams analyzed for 7.34% of eicosane indicating a 77% alkylation (yield) based on the α-eicosene. The clear liquid solution was adjusted to contain 50% by weight of the alkylated polyvinylpyrrolidone.

*Example XVII*

125 grams of poly(N-vinyl piperidine-2-one) (1.0 mole) was dissolved in 300 grams of normal amyl alcohol and after the addition of 16 grams (1.0 mole) of α-dodecene and 14.6 grams (0.1 mole) of di-t-butyl peroxide, the mixture was heated and maintained at 120–130° C. for 10 hours. Then a second addition of 7.3 grams of peroxide (0.05 mole) was made and heating continued. The reaction mixture was cooled after a total of 16 hours and analyzed. It was found to contain (7.4 grams) 1.2% by weight of α-dodecene corresponding to 95.6% alkylation based on amount of α-olefin charged. The final product was vacuum distilled to remove the amyl alcohol. 25 grams of the dried solid were dissolved in 50 grams of refined naphthenic stock by heating with agitation to 160° F. to yield a 50% solution.

*Example XVIII*

Poly(N-vinyl-ε-caprolactam) (34.8 grams, 0.25 mole) was dissolved in 200 grams of hexanol and after the addition of 67.2 grams (0.3 mole) of α-hexadecene and 4.4 grams (0.03 mole) of di-t-butyl peroxide, the solution was heated and maintained at 120°–135° C. After 15 hours a second addition of peroxide (3.3 grams) was made and heating continued. At the completion of 26 hours (total time), the reaction mixture was cooled and analyzed for the α-olefin. The solution was found to contain 1.61% by weight of hexadecene (5.0 grams) corresponding to 92.5% alkylation based on hexadecene charged. The solution was then vacuum distilled to remove the hexanol. 25 grams of the dried solid were dissolved in 50 grams of refined naphthenic stock by heating with agitation to 160° F. to yield a 50% solution.

The multi-functional additives of the present invention can be used to improve various hydrocarbon lubricating oils, i.e. base oils of natural origin, such as naphthenic base, paraffin base, mixed base lubricating oils, lubricating oils derived from coal products, synthetic oils of the alkylene oxide type and the polycarboxylic acid ester type, such as the oil soluble esters of adipic acid, sebacic acid, azelaic acid, etc. The natural hydrocarbon base oils may be blends of different mineral oil distillates and bright stock or blends of such oils with alkylene polymers. The base oils used generally will have a viscosity in the range of 30 to 100 SSU at 210° F., a viscosity index in the range of 50 to 108, a pour point below 30° F. and a flash point above 300° F. The blended oils will have viscosities in the range of 45 to 150 Saybolt Universal Seconds (SUS or SSU) at 210° F. and 250 to 700 SUS at 100° F.

When used in lubricating oils in amounts in the range of 1.0 to 20 weight percent, the multi-functional additives of the present invention impart improved viscosity index and excellent sludge and corrosion inhibiting properties. The additive may also be used in an additive concentrate in amounts of from 20 to 50 weight percent or more for addition to lubricating oils.

The multi-functional additive can be combined in amounts in the range of 0.1 to 10 weight percent in heating of fuel oils, or in jet fuels to disperse sludge and to impart corrosion resistance. The combination can also be used in amounts in the range of 0.5 to 20 weight percent in gear lubricants and automatic transmission fluids to inhibit varnish or sludge formation.

A lubricating oil containing the multi-functional additive of the present invention can also contain other additives used to improve other properties. For example, antioxidants, extreme pressure agents or pour point depressors, all of which are well known to the art.

To evaluate the alkylated polymers of the foregoing examples as lubricating oil additives, the following laboratory test procedure was employed:

2 grams of the 50% solution of active experimental additive (alkylated polymer) in refined naphthenic stock were weighed into a 250 ml. beaker containing 98 grams of a highly paraffinic mid-continent neutral oil having a viscosity of 46 SSU at 210° F. The sample was heated with agitation to 160° F. and stirred at that temperature for one minute. It was then allowed to cool to room temperature. The sample was checked for clarity at 160° F., 24 hours later at room temperature and 48 hours after that. If the sample remained clear the dispersancy test was carried out as follows:

To 80 grams of the same highly paraffinic oil containing 2% of the 50% active experimental additive were added 20 grams of an oxidized engine oil containing no additive. 2 cc. of water were added and the mixture was stirred vigorously in a Hamilton Beach Multimix Unit for 5 minutes at room temperature. After 5 minutes, the sample was poured into a centrifuge tube and centrifuged at 1500 R.P.M. for 2 hours. At the end of this period the sample was rated for dispersancy.

If no sludge was found at the bottom of the centrifuge tube, the dispersant passed; if a substantial amount of sludge was found and/or the supernatant liquid was clear, the dispersant failed. A mixture consisting of 80 grams of the highly paraffinic mid-continent neutral oil and 20 grams of an oxidized engine oil, both oils containing no dispersant, was used as a blank control.

The alkylated polymers of Examples I to V and VIII to XVIII were tested by the foregoing procedure. The results are shown in Table I.

TABLE I

| Additive of Example— | Solubility, 1% Active in highly paraffinic mid-continent neutral oil | | | Dispersancy, 1% Active, 2 hours |
|---|---|---|---|---|
| | Initial | 24 hrs. | 48 hrs. | |
| I | Clear | Clear | Clear | Pass. |
| II | do | do | do | Do. |
| III | do | do | do | Do. |
| IV | do | do | do | Do. |
| V | do | do | do | Do. |
| VIII | do | do | do | Do. |
| IX | do | do | do | Do. |
| X | do | do | do | Do. |
| XI | do | do | do | Do. |
| XII | do | do | do | Do. |
| XIII | do | do | do | Do. |
| XIV | do | do | do | Do. |
| XV | do | do | do | Do. |
| XVI | do | do | do | Do. |
| XVII | do | do | do | Do. |
| XVIII | do | do | do | Do. |
| Control | | | | Failed. |

The alkylated polymers of Examples I to V and VIII to XVIII were evaluated for V.I. improvement and Shear Stability by dissolving them at the desired concentration in solvent refined paraffinic oil having a viscosity of 45 SSU at 210° F. and V.I. of 80. All concentrations are expressed in terms of weight/weight percent on the basis of 100% additive. Solution preparation was accomplished by heating with continuous stirring until the alkylated polymer had dissolved in the oil giving a clear solution. The oil was heated to 190° F. to dissolve the 100 percent active materials. Materials which have been prepared at 35–50% activity could be dissolved by heating to only 150° F.

Kinematic viscosities (KV) at 210° F. and 100° F. were determined according to ASTM Procedure D445–61. Viscosity indices were calculated according to ASTM procedure D567–53. Shear stability of the oil-containing alkylated polymers was determined according to "Proposed Method of Test for Shear Stability of Polymer-Containing Oils," Appendix XII, page 1160, volume 1, 38th edition, October 1961, ASTM Committee D–2 on Petroleum Products and Lubricants.

The data obtained are presented in Table II.

TABLE II

| | KV 210 Centistokes | KV 100 Centistokes | V.I. | After Shearing, 30 Minutes | |
|---|---|---|---|---|---|
| | | | | KV 100 Centistokes | Percent Viscosity Decrease |
| Basic oil | 5.78 | 42.7 | 80 | 42.7 | 0 |
| 5% of Additive of Example: | | | | | |
| I | 6.52 | 46.5 | 95 | 46.4 | 0 |
| II | 6.47 | 49.56 | 100 | 49.50 | 0 |
| III | 6.38 | 46.7 | 98 | 46.5 | 0 |
| IV | 6.42 | 48.9 | 102 | 48.6 | 0 |
| V | 6.39 | 46.6 | 99 | 46.4 | 0 |
| VIII | 7.00 | 50.3 | 97 | 49.8 | 0 |
| IX | 6.58 | 46.38 | 98 | 46.1 | 0 |
| X | 6.60 | 46.24 | 102 | 46.0 | 0 |
| XI | 7.10 | 49.36 | 99 | 49.12 | 0 |
| XII | 6.38 | 45.24 | 100 | 45.12 | 0 |
| XIII | 6.46 | 45.32 | 98 | 45.20 | 0 |
| XIV | 7.22 | 46.8 | 98 | 46.4 | 0 |
| XV | 6.36 | 46.14 | 94 | 46.0 | 0 |
| XVI | 6.49 | 45.12 | 103 | 45.0 | 0 |
| XVII | 6.64 | 46.6 | 109 | 46.6 | 0 |
| XVIII | 7.32 | 50.46 | 119 | 50.50 | 0 |

The effectiveness of the alkylated polymers in lubricating oils in reducing the tendency to form sludge and varnish is shown by the results summarized in the following table of engine test, sludge and varnish heat, Federal Test Method, Standard No. 791a, Method 347, Dec.

30, 1961, described below. This test measures the ability of an oil to control sludge and varnish deposits in the CLR oil test engine operating under low temperature conditions. The basic L-43 technique was developed by CRC and involves steady-running operation at moderately low speed, high load and low water jacket temperatures using a rather severe deposit-forming reference fuel. The CLR L-43 procedure was modified to increase test severity and improve repeatability. The modifications included control of intake air humidity and blowby. Also interim inspections and ratings of five critical engine deposit areas are made at 20-hour intervals in order to determine the rate at which deposit forms. Test length is usually 240 hours but will vary depending on the ability of of the oil to control deposits. Results are reported in terms of hours to a given sludge deposit rating. The use of polished push rods and copper-lead bearings provide additional information in regard to rusting and bearing corrosion.

*Fuel and oil requirements.*—175 gallons of fuel and 1 gallon of oil for a 240-hour test.

*Test procedure.*—CLR engine is built up with the following new parts: Piston, weighed rings, polished push rods, weighed Cu-Pb bearings. After 1-hour breakin, it is run under the following test conditions:

Control.—No dispersant.
Tests:
 1—2% by volume of alkylated polymer of Example V.
 2—2% by volume of alkylated polymer of Example IX.
 3—2% by volume of alkylated polymer of Example XIV.
 4—2% by volume of alkylated polymer of Example XVI.

| | |
|---|---|
| Test length | 240 hours [1]. |
| Speed | 1800 r.p.m. |
| Load | Near full throttle. |
| A/F ratio | 15.0. |
| Intake manifold mixture temp. | 175° F. |
| Water in temp. | 115° F. |
| Water out temp. | 125° F. |
| Oil gallery temp. | 150° F. (approx.). |
| Blowby | 20 c.f.h. |
| Intake air humidity | 80 grains $H_2O$/lb. air. |
| Oil sump charge | 1 quart. |

[1] Will vary depending on quality of oil.

The lubricating oil employed as Control under the foregoing test conditions was a 20—20W paraffinic base oil having an SSU viscosity of 310 at 100° F. and 53–55 at 210° F. containing 0.8% of zinc dialkyl dithiophosphate commercially available under the brand-name of "Santolube 393." The oil for Tests 1, 2, 3 and 4 consisted of the control lubricating oil containing 2% by volume of the alkylated polymers of Examples V, IX, XIV and XVI, respectively.

The data obtained are presented in Table III.

TABLE III.—CLR ENGINE DISPERSANT TEST L-43 PROCEDURE

| | Control 1 | Tests | | | |
|---|---|---|---|---|---|
| | | 1 | 2 | 3 | 4 |
| Test hours | 100 | 400 | 400 | 400 | 400 |
| Hours until 9.0 average sludge rating | 26 | 225 | 204 | 223 | 205 |
| Hours until 9.0 average varnish rating | 60 | 167 | 155 | 162 | 158 |
| End of Test: | | | | | |
| Total sludge rating (50=clear) | 28.1 | 43.5 | 42.0 | 40.5 | 42.7 |
| Total varnish rating (50=clear) | 26.7 | 30.4 | 29.6 | 29.0 | 30 |
| Piston Varnish (10=clear) | 6.5 | 8.0 | 7.5 | 7.5 | 8.0 |
| Percent Oil screen clogging | 25 | 5.0 | 4.5 | 4.3 | 5.0 |
| Percent Oil ring clogging | 50 | 15 | 17 | 20 | 15 |

In addition to the foregoing evaluations, separate U.S. coastal oil samples having a viscosity of 40 SSU at 210° F. containing 2.0 volume percent of each of the alkylated polymers of Examples I to IV, VI to VIII, XV and XVII to XVIII to the modified L-43 low-temperature sludge and varnish test, with good ratings in sludge and varnish and with very low clogging of oil screen and oil rings.

Samples of 20—20W paraffinic base oil having an SSU viscosity of 310 at 100° F. and of "refined naphthenic stock" without and with 2% by volume of the alkylated polymers of Examples I to V and VIII to XVIII were subjected to corrosion test VVL 791 a 5323.2 in a humidity cabinet at 100° relative humidity and a temperature of 120° F. on 1020 steel polished panels and 1020 steel sandblasted panels. The oils without the alkylated polymers showed rusting on both types of panels at 8 hours. The oils containing the alkylated polymers showed rusting on the 1020 steel polished panels at 24 hours and at 48 hours on the 1020 steel sandblasted panels.

I claim:
1. A lubricating composition comprising a major amount of hydrocarbon lubricating oil having dissolved therein from about 0.1 to about 50 weight percent of an alkylated polymer prepared by the simultaneous polymerization and alkylation of one mole of at least one heterocyclic N-vinyl monomer selected from the class consisting of N-vinyl-2-oxazolidone, N-vinyl-3-morpholinone, N-vinyl succinimide, N-vinyl piperidine, N-vinyl diglycolylimide, N-vinyl glutarimide and monomers of the following formulae:

(1) 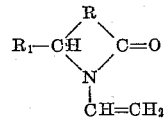

(2) 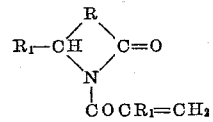

(3) 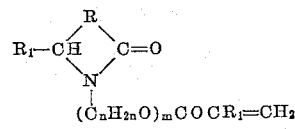

and (4) 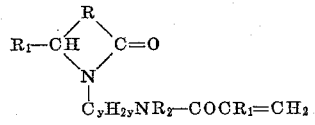

wherein R represents an alkylene bridge of from 2 to 4 carbon atoms to complete a 5-, 6- and 7-membered heterocyclic ring system, $R_1$ represents a member selected from the class consisting of hydrogen and methyl, $R_2$ represents a member selected from the class consisting of hydrogen, alkyl of from 1 to 12 carbon atoms and phenyl, $m$ is an integer of from 1 to 4, $n$ is an integer of from 1 to 4 and wherein $y$ is an integer of from 2 to 3, and by the alkylation of one mole of the polymer of at least one of said heterocyclic N-vinyl monomers, with 0.5 to 12 moles of an $\alpha$-olefin of from 8 to 42 carbon atoms in solution of an organic solvent common to said monomer, polymer and $\alpha$-olefin in the presence of 0.025 to 0.30 mole of an organic peroxide catalyst per mole of said $\alpha$-olefin at a temperature ranging from 80° to 200° C.

2. A lubricating composition comprising a major amount of hydrocarbon lubricating oil having dissolved therein from about 0.1 to about 50 weight percent of an alkylated polymer prepared by the alkylation of one mole of a polymer of at least one heterocyclic N-vinyl monomer selected from the class consisting of N-vinyl-2-oxazolidone, N-vinyl-3-morpholinone, N-vinyl succinimide, N-vinyl piperidine, N-vinyl diglycolylimide, N-vinyl glutarimide and monomers of the following formulae:

(1) 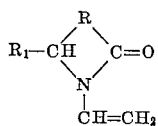

(2) 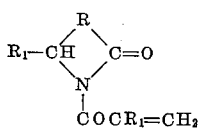

(3) 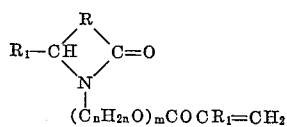

and (4) 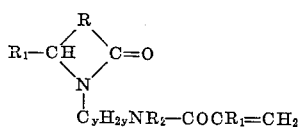

wherein R represents an alkylene bridge of from 2 to 4 carbon atoms to complete a 5-, 6- and 7-membered heterocyclic ring system, $R_1$ represents a member selected from the class consisting of hydrogen and methyl, $R_2$ represents a member selected from the class consisting of hydrogen, alkyl of from 1 to 12 carbon atoms and phenyl, $m$ is an integer of from 1 to 4, $n$ is an integer of from 1 to 4 and wherein $y$ is an integer of from 2 to 3, with 0.5 to 12 moles of an α-olefin of from 8 to 42 carbon atoms in solution of an organic solvent common to said polymer and α-olefin in the presence of 0.025 to 0.30 mole of an organic peroxide catalyst per mole of said α-olefin at a temperature ranging from 80° to 200° C.

3. A lubricating composition comprising a major amount of hydrocarbon lubricating oil having dissolved therein from about 0.1 to about 50 weight percent of an alkylated polymer prepared by the simultaneous polymerization and alkylation of one mole of at least one heterocyclic N-vinyl monomer selected from the class consisting of N-vinyl-2-oxazolidone, N-vinyl-3-morpholinone, N-vinyl succinimide, N-vinyl piperidine, N-vinyl diglycolylimide, N-vinyl glutarimide and monomers of the following formulae:

(1) 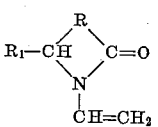

(2) 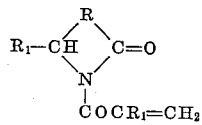

(3) 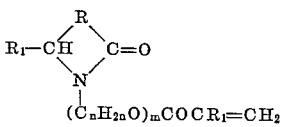

and (4) 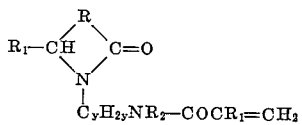

wherein R represents an alkylene bridge of from 2 to 4 carbon atoms to complete a 5-, 6- and 7-membered heterocyclic ring system, $R_1$ represents a member selected from the class consisting of hydrogen and methyl, $R_2$ represents a member selected from the class consisting of hydrogen, alkyl of from 1 to 12 carbon atoms and phenyl, $m$ is an integer of from 1 to 4, $n$ is an integer of from 1 to 4 and wherein $y$ is an integer of from 2 to 3, with 0.5 to 12 moles of an α-olefin of from 8 to 42 carbon atoms in solution of an organic solvent common to said monomer and α-olefin in the presence of 0.025 to 0.30 mole of an organic peroxide catalyst per mole of said α-olefin at a temperature ranging from 80° to 200° C.

4. A lubricating composition comprising a major amount of hydrocarbon lubricating oil having dissolved therein from about 0.1 to about 50 weight percent of an alkylated polymer prepared by the simultaneous polymerization and alkylation of one mole of at least one N-vinyl lactam with 0.5 to 12 moles of an α-olefin of from 8 to 42 carbon atoms in solution of an organic solvent common to said lactam and α-olefin in the presence of 0.025 to 0.30 mole of an organic peroxide catalyst per mole of said α-olefin at a temperature ranging from 80° to 200° C.

5. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl-2-pyrrolidone with 0.5 to 12 moles of an α-olefin of from 8 to 42 carbon atoms in solution of an organic solvent common to said pyrrolidone and α-olefin in the presence of 0.025 to 0.30 mole of an organic peroxide catalyst per mole of said α-olefin at a temperature ranging from 80° to 200° C.

6. A lubricating composition comprising major amount of hydrocarbon lubricating oil having dissolved therein from about 0.1 to about 50 weight percent of an alkylated polymer prepared by the simultaneous polymerization and alkylation of one mole of N-vinyl-5-methyl-2-pyrrolidone with 0.5 to 12 moles of an α-olefin of from 8 to 42 carbon atoms in solution of an organic solvent common to said pyrrolidone and α-olefin in the presence of 0.025 to 0.30 mole of an organic peroxide catalyst per mole of said α-olefin at a temperature ranging from 80° to 200° C.

7. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl-2-piperidone with 0.5 to 12 moles of an α-olefin of from 8 to 42 carbon atoms in solution of an organic solvent common to said piperidone and α-olefin in the presence of 0.025 to 0.30 mole of an organic peroxide catalyst per mole of said α-olefin at a temperature ranging from 80° to 200° C.

8. A lubricating composition comprising a major amount of hydrocarbon lubricating oil having dissolved therein from about 0.1 to about 50 weight percent of an alkylated and polymerized N-vinyl-ε-caprolactam obtained by the simultaneous polymerization and alkylation of one mole of at least one N-vinyl-ε-caprolactam with 0.5 to 12 moles of an α-olefin of from 8 to 42 carbon atoms in solution of an organic solvent common to said caprolactam and α-olefin in the presence of 0.025 to 0.30 mole of an organic peroxide catalyst per mole of said α-olefin at a temperature ranging from 80° to 200° C.

9. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl-2-oxazolidone with 0.5 to 12 moles of an α-olefin of from 8 to 42 carbon atoms in solution of an organic solvent common to said oxazolidone and α-olefin in the presence of 0.025 to 0.30 mole of an organic peroxide catalyst per mole of said α-olefin at a temperature ranging from 80° to 200° C.

10. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl-3-morpholinone with 0.5 to 12 moles of an α-olefin of from 8 to 42 carbon atoms in solution of an organic solvent common to said morpholinone and α-olefin in the presence of 0.025 to 0.30 mole of an organic peroxide catalyst per mole of said α-olefin at a temperature ranging from 80° to 200° C.

11. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl succinimide with 0.5 to 12 moles of an α-olefin of from 8 to 42 carbon atoms in solution of an organic solvent common to said succinimide and α-olefin in the presence of 0.025 to 0.30 mole of an organic peroxide catalyst per mole of said α-olefin at a temperature ranging from 80° to 200° C.

12. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl glutarimide with 0.5 to 12 moles of an α-olefin of from 8 to 42 carbon atoms in solution of an organic solvent common to said glutarimide and α-olefin in the presence of 0.025 to 0.30 mole of an organic peroxide catalyst per mole of said α-olefin at a temperature ranging from 80° to 200° C.

13. A lubricating composition comprising a major amount of hydrocarbon lubricating oil having dissolved therein from about 0.1 to about 50 weight percent of an alkylated polymer prepared by the simultaneous polymerization and alkylation of one mole of N-vinyl diglycolylimide with 0.5 to 12 moles of an α-olefin of from 8 to 42 carbon atoms in solution of an organic solvent common to said diglycolylimide and α-olefin in the presence of 0.025 to 0.30 mole of an organic peroxide catalyst per mole of said α-olefin at a temperature ranging from 80° to 200° C.

14. A lubricating oil composition comprising a major amount of hydrocarbon lubricating oil having dissolved therein from about 0.1 to about 50 weight percent of an alkylated polymer prepared by the simultaneous polymerization and alkylation of one mole of N-vinyl-2-pyrrolidone with one mole of α-eicosene in solution of an organic solvent common to the said pyrrolidone and α-eicosene in the presence of 0.15 mole of di-t-butyl peroxide at a temperature of 130–135° C.

15. A lubricating oil composition comprising a major amount of hydrocarbon lubricating oil having dissolved therein from about 0.1 to about 50 weight percent of an alkylated polymer prepared by the simultaneous polymerization and alkylation of one mole of N-vinyl-2-piperidone with one mole of α-octadecene in solution of an organic solvent common to the said piperidone and α-octadecene in the presence of 0.1 mole of di-t-butyl peroxide at reflux, 120° C. pot temperature.

16. A lubricating oil composition comprising a major amount of hydrocarbon lubricating oil having dissolved therein from about 0.1 to about 50 weight percent of an alkylated polymer prepared by the simultaneous polymerization and alkylation of one mole of N-vinyl-ε-caprolactam with 0.85 mole of α-octadecene in solution of an organic solvent common to the said caprolactam and α-eicosene in the presence of 0.09 mole of di-t-butyl peroxide at a temperature of 130–135° C.

17. A lubricating oil composition comprising a major amount of hydrocarbon lubricating oil having dissolved therein from about 0.1 to about 50 weight percent of an alkylated polymer prepared by the simultaneous polymerization and alkylation of one mole of N-vinyl-5-methyl-2-pyrrolidone with 0.9 mole of α-octadecene in solution of an organic solvent common to the said pyrrolidone and α-octadecene in the presence of 0.1 mole of di-t-butyl peroxide at a temperature of 120–140° C.

18. A lubricating oil composition comprising a major amount of hydrocarbon lubricating oil having dissolved therein from about 0.1 to about 50 weight percent of the alkylated homopolymer prepared by the alkylation of one mole of polyvinylpyrrolidone with 0.7 mole of α-eicosene in solution of an organic solvent common to said pyrrolidone and α-eicosene in the presence of 0.1 mole of di-t-butyl peroxide at a temperature of 125–130° C.

19. A lubricating oil composition comprising a major amount of hydrocarbon lubricating oil having dissolved therein from about 0.1 to about 50 weight percent of the alkylated homopolymer prepared by the alkylation of one mole of polyvinylpiperidone with one mole of α-dodecene in solution of an organic solvent common to said piperidone and α-dodecene in the presence of 0.15 mole of di-t-butyl peroxide at a temperature of 120°–130° C.

20. A lubricating oil composition comprising a major amount of hydrocarbon lubricating oil having dissolved therein from about 0.1 to about 50 weight percent of the alkylated homopolymer prepared by the alkylation of one mole of polyvinylcaprolactam with 1.2 mole of α-hexadecene in solution of an organic solvent common to said caprolactam and α-hexadecene in the presence of 0.21 mole of di-t-butyl peroxide at a temperature of 120°–135° C.

References Cited by the Examiner

UNITED STATES PATENTS

| | | | |
|---|---|---|---|
| 2,818,362 | 12/1957 | Drechsel | 260—88.1 X |
| 2,952,668 | 9/1960 | Ehlers | 260—88.1 X |
| 3,153,640 | 11/1964 | Barnum et al. | 252—51.5 X |

FOREIGN PATENTS

| | | |
|---|---|---|
| 808,665 | 2/1959 | Great Britain. |
| 851,588 | 10/1960 | Great Britain. |

DANIEL E. WYMAN, *Primary Examiner.*

P. P. GARVIN, *Assistant Examiner.*